United States Patent [19]

Harada et al.

[11] Patent Number: 4,710,216

[45] Date of Patent: Dec. 1, 1987

[54] METHOD OF MAKING FLEXIBLE OPTICAL FIBER BUNDLE

[75] Inventors: Yuho Harada; Tsutomu Maruyama; Yoshiyuki Kumakura; Shigeo Kuwayama, all of Ohmiya, Japan

[73] Assignee: Fuji Photo Optical Co., Ltd., Japan

[21] Appl. No.: 808,226

[22] Filed: Dec. 12, 1985

Related U.S. Application Data

[63] Continuation of Ser. No. 485,285, Apr. 15, 1983, abandoned.

[30] Foreign Application Priority Data

Apr. 19, 1982 [JP] Japan .................................. 57-65064
Mar. 24, 1983 [JP] Japan .................................. 58-49614

[51] Int. Cl.$^4$ ........................ C03B 23/20; C03B 37/10
[52] U.S. Cl. ......................................... 65/4.1; 65/4.2; 65/31
[58] Field of Search ...................... 65/3.13, 3.15, 3.43, 65/3.44, 4.1, 4.2, 4.21, 31; 330/96.23, 96.24, 96.29

[56] References Cited

U.S. PATENT DOCUMENTS

| 3,938,974 | 2/1976 | Macedo et al. | 65/3.15 |
| 4,080,045 | 3/1978 | Nakatsubo et al. | 65/3.43 |
| 4,099,837 | 7/1978 | Vazirani | 350/96.29 |
| 4,317,615 | 3/1982 | Herold | 350/96.23 |
| 4,388,093 | 6/1983 | Kimura et al. | 65/3.43 |
| 4,389,089 | 6/1983 | Strack | 65/3.15 |

FOREIGN PATENT DOCUMENTS

| 50-98344 | 8/1975 | Japan . | |
| 53-24815 | 7/1978 | Japan . | |
| 17940 | 2/1981 | Japan | 65/31 |
| 6088839 | 6/1981 | Japan | 65/31 |
| 56-27841 | 6/1981 | Japan . | |
| 56-47526 | 11/1981 | Japan . | |
| 56-48844 | 11/1981 | Japan . | |
| 57-20603 | 4/1982 | Japan . | |
| 0146204 | 9/1982 | Japan | 65/3.43 |
| 0202504 | 12/1982 | Japan | 65/4.1 |

Primary Examiner—S. Leon Bashore
Assistant Examiner—Michael K. Boyer
Attorney, Agent, or Firm—Pasquale A. Razzano

[57] ABSTRACT

A bundle of optical fibers each covered by an acid-soluble borosilicate glass is treated with an acid solution, with an alkali solution, and then with an acid solution to completely remove the acid-soluble glass from the middle portion between the end portions of the optical fiber bundle. A plastic material is charged into the interstices among the fibers at the boundary portions between the middle portion and the end portions. These interstices are free of any insoluble residue of the acid-soluble glass. A reinforcement is formed around the periphery of at least a part of the boundary portions by covering the periphery with a flexible plastic material or by winding a linear member around the periphery.

5 Claims, 15 Drawing Figures

METHOD OF MAKING FLEXIBLE OPTICAL FIBER BUNDLE

This application is a continuation of application Ser. No. 485,285, filed Apr. 15, 1983 (now abandoned).

BACKGROUND OF THE INVENTION

1. Field of the Invention

This invention relates to a method of making an optical fiber bundle having flexibility, and the optical fiber bundle produced by the method. More particularly, this invention relates to a method of making an optical fiber bundle wherein individual optical fibers are firmly fixed together at least at a portion of the optical fiber bundle, and are separated from one another at a portion other than the aforesaid fixed portion so that the optical fiber bundle has flexibility the invention is also in the optical fiber bundle produced by the method.

2. Description of the Prior Art

Optical fiber bundles are used for image guides, light guides and the like. When an optical fiber bundle is used as an image guide, it is necessary to correctly arrange the individual fibers so that they are maintained in identical geometrical patterns at both end portions in order to obtain a sharp and correct image. Furthermore, for example when the optical fiber bundle for the image guide is used in an endoscope, the middle portion between the end portions of the optical fiber bundle must be flexible and the end portions must be capable of being bent freely and acutely so that the endoscope can be inserted into any desired portion in a hollow body, such as human body cavity, an interior space in a machine, or the like, in order to observe the portion concerned.

Various methods have been proposed to make an optical fiber bundle wherein the middle portion between the end portions has flexibility and the end portions can be bent freely and acutely.

For example, it is know to make a flexible optical fiber bundle for use as an image guide by introducing a core glass having a high refractive index into an inner crucible of a double crucible and introducing a cladding glass having a low refractive index into the outer crucible, heating the double crucible to an appropriate temperature, drawing both glasses from a hole positioned at the bottom of the double crucible so as to cover the core glass with the cladding glass, closely looping the obtained optical fiber in one row, and fixing a portion of the formed loop with an adhesive. Then, another optical fiber is formed and closely looped in one row on the previously formed loop in the same way as described above, and fixed with an adhesive at the fixed section of the previously formed loop. The aforesaid operations are repeated to obtain a loop-like optical fiber bundle having a desired thickness, approximately the center of the fixed section of the loop-like optical fiber bundle is cut perpendicularly to the length of the optical fibers, and the cut faces are ground or polished. In this method, since a very thin optical fiber having a thickness of, for example, about 20μ is formed by one heating operation, the subsequent arrangement work requires a high-degree skill in handling an extremely thin optical fiber, and there is risk of the fiber breaking. Thus, this method is disadvantageous in that the image guide can be produced only at a low yield and, consequently, is expensive.

It is also known to make an optical fiber bundle by use of an acid-soluble glass. In this method, a core glass having a high refractive index is introduced into the innermost crucible of a triple crucible, a cladding glass having a low refractive index is introduced into an intermediate crucible, and an acid-soluble glass is introduced into the outermost crucible. The whole triple crucible is heated to an appropriate temperature, and the molten glasses are drawn from a hole positioned at the bottom of the triple crucible so as to cover the core glass with the cladding glass and further cover the surface of the cladding glass with the acid-soluble glass. In this way, a triple optical fiber having a diameter of about 200μ is formed and cut to an appropriate length of about 400 mm. Many (e.g. 10,000) fibers thus obtained are bundled, fused together, heated to an appropriate temperature, and stretched until the diameter of each optical fiber is reduced to about 1/15 the initial diameter. Both end portions of the hard optical fiber bundle thus obtained are covered with an acid resistant covering material, and then the whole optical fiber bundle is contacted with an acid (for example, nitric acid) to dissolve out the acid-soluble glass from the middle portion of each optical fiber. In this method, since a relatively thick fiber having a thickness of about 200μ is handled, the optical fiber arranging work is easier than in the first-mentioned method, and there is less risk of the fiber's breaking. Further, since the fibers are fused together with heat after they are arranged, there is no risk of the fused fibers breaking. Accordingly, this method can produce an optical fiber bundle with a higher yield and at a lower cost than is possible with the first-mentioned method.

However, in the second method mentioned above there is a large fluctuation in the acid dissolution rate during acid treatment. For example, in some hard optical fiber bundles, the acid-soluble glass covering the respective fibers is relatively quickly dissolved out from the fibers at the middle portions of the optical fiber bundles, and the fibers at the middle portions become separated from one another. However, in other hard optical fiber bundles, it sometimes happens that the acid-soluble glass is dissolved out only from the fibers near the peripheries of the optical fiber bundles, and the fibers positioned at the centers of the optical fiber bundles become surrounded by protective layers which inhibit the acid solution from permeating into interstices among individual fibers at the centers of the optical fiber bundles to dissolve the acid-soluble glass therefrom. It is presumed that, since the protective layers mainly comprise silica gel, dissolution with the acid solution becomes difficult. When large fluctuation occurs in the acid dissolution rate from on optical fiber bundle to another, the cladding layers of the individual optical fibers of the optical fiber bundles exhibiting a higher acid dissolution rate suffer from erosion by the acid solution over a longer period, and the mechanical strength of these optical fiber bundles becomes low. In order to eliminate the above-mentioned drawback, various attempts have been made to contact the surfaces of the hard optical fiber with a fresh acid solution by subjecting the acid solution to ultrasonic wave treatment, moving the hard optical fiber bundles in the acid solution, or agitating the acid solution. However, due to breakage or entanglement of the optical fibers, these attempts have not been successful in providing flexible optical fiber bundles of high quality at a high efficiency. Further, it has been proposed in Japanese Patent Publication No. 56(1981)-27841 to employ an apparatus wherein a hard optical fiber bundle is inserted into a pipe or a space defined by partition plates, both end portions of the optical fiber bundle are fixed by clamps of the pipe or the partition plates, and an acid solution is introduced into the pipe or the space defined by the partition plates to dissolve the acid-soluble glass from the fibers at the middle portion of the optical fiber bundle. However, in this apparatus, in order to minimize fluctuation in the acid dissolution rate in treatment with the acid solution, it is necessary to greatly increase the flow rate of the acid solution. Consequently, there arises a risk of the optical fibers breaking or being entangled.

Besides the fluctuation in the acid dissolution rate, the aforesaid method presents the very real problem that an insoluble residue of glass remains unremoved at portions near the border lines between the flexible middle portion of the optical fiber bundle and the end portions thereof where the individual fibers are fixed to one another after treatment with the acid solution, and the life of the product is adversely affected by the insoluble residue. In order to eliminate this drawback, various method have been proposed. For example, Japanese Patent Publication No. 56(1981)-47526 and U.S. Pat. No. 4,086,045 disclose an optical fiber bundle having end portions reinforced by covering the portions near the interfaces between the flexible middle portion of the optical fiber bundle and the end portions thereof, where an insoluble residue of glass remains unremoved, by a plastic exhibiting appropriate hardness and appropriate flexibility, and further charging said plastic into the interstices among individual fibers at portions close to the interfaces. Japanese Unexamined Patent Publication No. 50(1975)-98344 discloses an optical fiber bundle having high strength against bending wherein the portions near the interfaces between the flexible middle portion of the optical fiber bundle and the end portions thereof, where an insoluble residue of glass remains unremoved, is covered by a reinforcing pipe the flexibility of which varies in a continuous or step-wise gradient. Japanese Patent Publication No. 56(1981)-48844 describes an optical fiber bundle having end portions reinforced by impregnating the interstices among individual fibers at the semi-dissolved portions (where an insoluble residue of glass exists) between the flexible middle portion of the optical fiber bundle and the solid end portions thereof with a high-molecular material exhibiting high hardness, good adhesion and low viscosity, curing the high-molecular material, impregnating the vicinities of the portions where the high-molecular material bleeds with an elastomer exhibiting low viscosity, and curing the elastomer. Japanese Patent Publication No. 53(1978)-24815 and U.S. Pat. No. 3,624,816 describe a method of making an optical fiber bundle having flexibility by employing a silica-free glass as the acid-soluble glass and substantially completely removing the insoluble residue of glass from the optical fiber bundle. U.S. Pat. No. 3,383,192 discloses a method of charging a plastic into the vicinities of the interfaces between the flexible middle portion of an optical fiber bundle and the end portions where the respective fibers are fused together with heat.

However, the prior techniques mentioned above have various drawbacks as described below. Namely, in the optical fiber bundles disclosed in Japanese Patent Publication No. 56(1981)-47526, U.S. Pat. No. 4,080,045, Japanese Unexamined Patent Publication No. 50(1975)-98344 and Japanese Patent Publication No. 56(1981)-48844, the portions where an insoluble residue of glass remains unremoved cause the lengths of the end portions of the optical fiber bundle to become longer and make is difficult to acutely bend the end portions. Further, when a plastic is charged into interstices among individual fibers at portions close to the interfaces between the middle portion and the end portions of the optical fiber bundle to reinforce the portions close to the border lines, it is not always possible to completely mix the plastic with the insoluble residue of glass among the optical fibers at the portions close to the interfaces. Also, from the viewpoint of the chemical composition, size and amount of the insoluble residue, or the like, it is not always possible for the insoluble residue to attain the same effect as fillers employed in fiber-reinforced plastics (FRP). Conversely, the presence of the insoluble residue of glass presents a risk of damage to the optical fibers. Further, in the techniques disclosed in the four publications mentioned above, it is not always possible to efficiently make an optical fiber bundle for use as an image guide exhibiting high mechanical strength and uniform quality because of fluctuation in the acid dissolution rate.

In the optical fiber bundles disclosed in Japanese Patent Publication No. 53(1978)-24815 and U.S. Pat. No. 3,624,816, since a silica-free glass is employed as the acid-soluble glass, substantially no insoluble residue of glass remains in the optical fiber bundles. This is very convenient in the process of treatment with an acid solution. In general, however, since silica-free glass exhibits very large changes in viscosity with changes in temperature, it is very difficult to form fibers having an extremely high dimensional accuracy such as the optical fibers of an image guide should have. Also in the method disclosed in U.S. Pat. No. 3,383,192, no insoluble residue remains unremoved since only the fibers at the end portions of the optical fiber bundle are fused together with heat and treatment with an acid solution is not carried out. However, since the end portions where the individual fibers are fixed to one another and the vicinities of the end portions are heated to a temperature above the annealing temperature of the glass, the mechanical strength and the flexibility of the optical fiber bundle becomes very low in the cases of thin optical fibers (having a thickness of, for example, about 15μ) such as fibers employed in an image guide. In general, it is known that the mechanical strength of glass fibers considerably decreases even with heating at a temperature below the softening temperature.

SUMMARY OF THE INVENTION

One object of the present invention is to provide a method of making an optical fiber bundle having flexibility, the end portions of which can be bent at an acute angle, and an optical fiber bundle produced by such method.

Another object of the present invention is to provide a method of making an optical fiber bundle having flexibility and exhibiting high mechanical strength, and an optical fiber bundle produced by such method.

Yet another object of the present invention is to provide a method of making an optical fiber bundle having flexibility and exhibiting high quality and accuracy at a high efficiency, and to provide as well an optical fiber bundle produced by the method.

The method of making an optical fiber bundle having flexibility in accordance with the present invention comprises the steps of:

(i) providing a plurality of optical fibers each comprising a core glass having a high refractive index, a cladding glass having a low refractive index coated on the core glass, and an acid-soluble borosilicate glass coated on the cladding glass, (ii) forming a hard optical fiber bundle by bundling, heating and stretching optical fibers, (iii) covering at least one end portion of said optical fiber bundle with an acid-resistant material, (iv) dissolving out said acid-soluble borosilicate glass from the portion other than said covered portion of said optical fiber by first treating the whole optical fiber bundle with an acid solution, then treating the whole optical fiber bundle with an alkali solution, and further treating the whole optical fiber bundle with an acid solution, (v) charging a plastic material having flexibility and exhibiting little change in volume during curing into the interstices among the individual fibers at the portion proximate the interfaces between said at least one covered and fixed portion of said optical fiber bundle and the portion thereof from which said acid-soluble borosilicate glass has been removed by dissolution, and (vi) forming a reinforcement around the periphery of at least a part of said portion of the bundle proximate the interface.

The present invention also provides a novel optical fiber bundle produced by the method in accordance with the present invention.

In the present invention, the process of treatment with an alkali solution is inserted between the processes of treatment with an acid solution to dissolve protective layers consisting mainly of silica gel, which are formed around the central portions of the optical fiber bundles during the first process of treatment with an acid solution, thereby to minimize fluctuation in the dissolution rate of the acid-soluble glass among the individual optical fiber bundles in the process of treatment with an acid solution. Therefore, it is possible to prevent the mechanical strength of the optical fiber bundles from decreasing due to fluctuation in the dissolution rate and to make optical fiber bundles having flexibility and high quality quickly (for example, in about 70 minutes) and at a high efficiency. The optical fiber bundle obtained in accordance with the present invention contains substantially no insoluble residue in the flexible portion and also the portion proximate the interface between the flexible portion and the fixed end portion. The fixed end portion of the optical fiber bundle can be bent at an acute angle with respect to the flexible portion and, therefore, the optical fiber bundle is very suitable for the production of image guides for endoscopes and the like. Further, since the treatment time for dissolution of the acid-soluble glass can be controlled without strong agitation of the treatment solution or the like, it is possible to automatically conduct the dissolution treatment process at a high efficiency without causing a decrease in the yield of the optical fiber bundle.

DESCRIPTION OF THE PREFERRED EMBODIMENTS

The present invention will hereinbelow be described in further detail with reference to the accompanying drawings.

Figure 2:
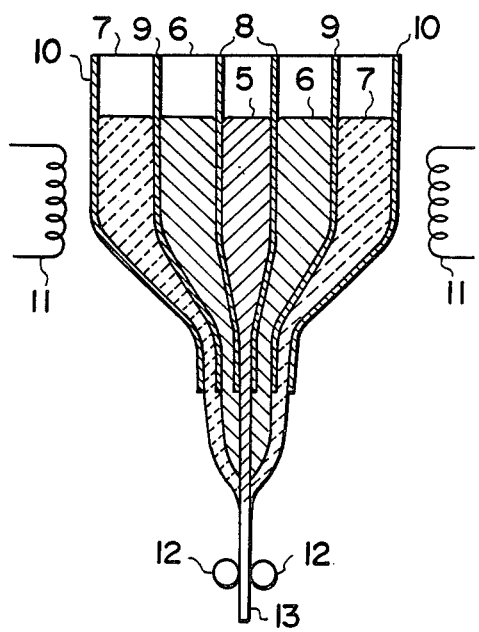
FIG. 2 is a schematic view showing the process of drawing an optical fiber by heating a triple crucible.

In FIG. 2, a core glass 5 having a high refractive index is introduced into an innermost crucible 8 of a triple crucible. A cladding glass 6 having a low refractive index in introduced into an intermediate crucible 9, and an acid-soluble borosilicate glass 7 is introduced into an outermost crucible 10. The core glass 5 employed in the present invention may, for example, have the following composition and properties:

Composition (expressed in terms of % by weight): 45.0% of $SiO_2$, 11.0% of $K_2O$, 24.0% of PbO, 12.0% of BaO, 5.0% of ZnO, 3.0% of $Al_2O_3$, and 0.7% of $As_2O_3$.

Properties:

refractive index (Nd): 1.59062, transition point; 528° C., softening point: 583° C., thermal expansion coefficient: $99 \times 10^{-7}$ cm/cm.°C.

The cladding glass 6 employed in the present invention may, for example, have the following composition and properties:

Composition (expressed in terms of % by weight): 64.0% of $SiO_2$, 16.0% of $Na_2O$, 12.0% of PbO, 5.0% of ZnO, 3.0% of $Al_2O_3$, and 0.7% of $As_2O_3$.

Properties:

refractive index (Nd): 1.52852, transition point; 486° C., softening point: 533° C., thermal expansion coefficient: $98 \times 10^{-7}$ cm/cm.°C.

The acid-soluble glass 7 employed in the present invention may, for example, have the following composition and properties:

Composition (expressed in terms of % by weight): 19.5% of $SiO_2$, 36.5% of $B_2O_3$, 11.0% of $Na_2O$, 26.0% of BaO, 7.0% of ZnO, and 0.3% of $As_2O_3$.

Properties:

refractive index (Nd): 1.58090, transition point; 540° C., softening point: 574° C., thermal expansion coefficient: $92 \times 10^{-7}$ cm/cm.°C.

After the core glass 5, the cladding glass 6 and the acid-soluble glass 7 are introduced into the triple crucible, the triple crucible is heated in an electric furnace 11, and a triple optical fiber 13 is drawn from the triple crucible by rollers 12.

Figure 1:
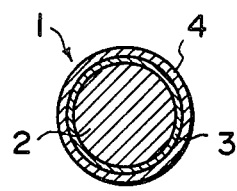
FIG. 1 is a sectional view showing a triple optical fiber.

FIG. 1 is a sectional view of the triple optical fiber taken in the diametral direction. In FIG. 1, the outer diameter of a triple optical fiber 1 is about 200μ, the thickness of a cladding glass 3 is about 20μ, and the thickness of an acid-soluble glass 4 is about 5μ.

Thereafter, the triple optical fiber 1 is cut to a length of about 400 mm. A plurality of the thus obtained optical fibers (about 10,000 fibers) are closely arranged so that they are maintained in identical geometrical patterns at both end portions, thereby to form an optical fiber bundle. The optical fiber bundle is then heated to fuse the respective fibers with one another.

Figure 3:
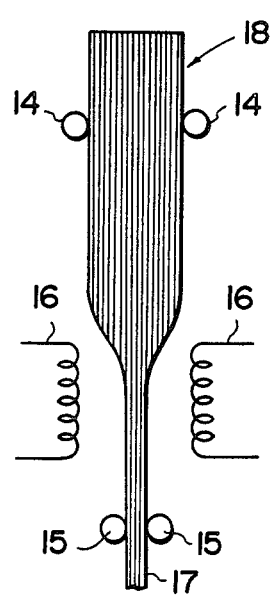
FIG. 3 is a schematic view showing the process of heating and stretching a heat-fused optical fiber bundle.

As shown in FIG. 3, the optical fiber bundle fused with heat is further heated and stretched. Specifically, an optical fiber bundle 18 fused with heat is gradually moved down by rollers 14. The lower end portion of the optical fiber bundle 18 is heated and softened at a temperature of about 700° C. by an electric furnace 16, and stretched downwardly by rollers 15. In this case, the optical fiber bundle 18 is stretched until the diameter of the stretched optical fiber portion 17 is about 1/15 of the diameter of the optical fiber bundle 18, i.e. until it is about 1.5 mm. As a result, the diameter of each optical fiber becomes about 13μ.

Figure 4:
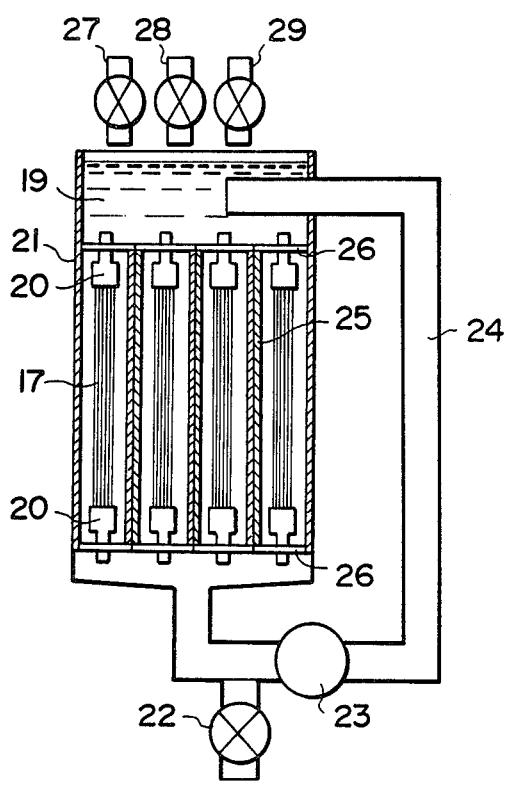
FIG. 4 is a schematic view showing the process of treatment for dissolving acid-soluble glass from stretched optical fiber bundles.

Thereafter, both end portions of the hard optical fiber bundle 17 obtained as described above are covered with coverings 20 for preventing the acid-soluble glass from dissolving out from both end portions. A number of the hard optical fiber bundles 17 having the coverings 20 at both end portions are then inserted into the spaces defined by partition plates 25 and walls of a treatment tank 21 as shown in FIG. 4. The hard optical fiber bundles 17 are fixed approximately at the centers between the partition plates 25 or between the partition plates 25 and the walls of the treatment tank 21 by use of clamps 26 positioned at both end portions of the respective partition plates 25 so that the hard optical fiber bundles 17 are slightly slack in their longitudinal direction. Then, 1N nitric acid at a temperature of about 70° C. is introduced into the treatment tank 21, and circulated through the spaces defined by the partition plates 25 and the walls of the treatment tank 21 for about 20 minutes by a pump 23.

During this process, in some hard optical fiber bundles 17, the acid-soluble glass is dissolved out from the individual fibers at the middle portions of the hard optical fiber bundles 17, and the individual fibers are separated from one another at the middle portions. However, in other hard optical fiber bundles 17, the acid-soluble glass is dissolved out only from the fibers near the peripheries of the optical fiber bundles 17, and the fibers positioned at the centers of the optical fiber bundles 17 become surrounded by protective layers which inhibit further dissolution of the acid-soluble glass from these fibers. After the first treatment with the acid solution is conducted, a discharge valve 22 positioned below the treatment tank 21 is opened to discharge the 1N nitric acid from the treatment tank 21. Then, a valve 28 above the treatment tank 21 is opened, and the optical fiber bundles 17 are washed with water for about five minutes. After the first washing with water is finished, 0.6N NaOH at a temperature of about 55° C. is introduced into the treatment tank 21 through a valve 29 positioned above the treatment tank 21, and circulated through the spaces defined by the partition plates 25 and the walls of the treatment tank 21 for about five minutes. During this process, the protective layers developed during the first treatment with the acid solution almost completely disappear. After the first treatment with the alkali solution is conducted, the discharge valve 22 positioned below the treatment tank 21 is opened to discharge the 0.6N NaOH solution from the treatment tank 21. Thereafter, the valve 28 positioned above the treatment tank 21 is opened, and a second washing with water is carried out for about five minutes. After the second washing with water is over, 1N nitric acid at a temperature of about 70° C. is introduced into the treatment tank 21 through the valve 27 positioned above the treatment tank 21, and circulated through the spaces defined by the partition plates 25 and the walls of the treatment tank 21 for about 15 minutes. During this process, the acid-soluble glass layers of the fibers at the middle portions of the hard optical fiber bundles 17 are completely dissolved out, and the fibers at the middle portions are separated from one another. After the second treatment with the acid solution is finished, the 1N nitric acid is discharged from the treatment tank 21 through the discharge valve 22 positioned below the treatment tank 21. Then, the valve 28 positioned above the treatment tank 21 is opened, and the optical fiber bundles 17 are washed with water for about 20 minutes. After the third washing with water is over, the optical fiber bundles 17 are dried to obtain optical fiber bundles having flexibility, high quality and high and uniform mechanical strength.

It is also possible to add a second alkali solution treatment to the combination of the first acid solution treatment, the first alkali solution treatment and the second acid solution treatment. In this case, the insoluble residue of the acid-soluble glass at the portions proximate the interfaces between the flexible middle portion and the fixed end portions of each optical fiber bundle 17 can be removed more quickly and almost completely. It is also possible to combine the acid solution treatment and the alkali solution treatment in various manners according to the treatment conditions. For example, a combination of alkali solution treatment and acid solution treatment may be repeated once or more after the aforesaid basic combination of treatment with the acid solution, the alkali solution and the acid solution. If necessary, alkali solution treatment may further be added finally. The concentrations and temperatures of the acid solution and the alkali solution, time of treatment with these solutions, temperature of washing water, washing time, and the like employed in the above-described embodiment are typical examples, and any other combination of conditions may be employed.

Figure 5:
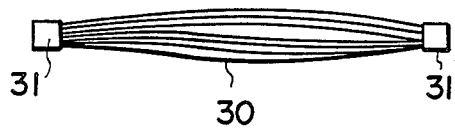
FIG. 5 is a schematic view showing an optical fiber bundle wherein individual fibers are bonded together at both end portions of the optical fiber bundle, and separated from one another in the middle portion thereof so that the optical fiber bundle has flexibility.
Figure 6:
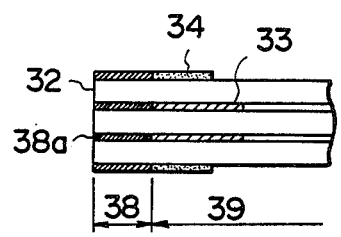
FIG. 6 is a partial sectional view showing an embodiment of the optical fiber bundle having flexibility in accordance with the present invention.

FIG. 5 is a schematic view showing the optical fiber bundle rendered flexible by the aforesaid dissolution treatment. In FIG. 5, the reference numeral 30 designates the flexible portion, and the reference numerals 31 denote the end portions. FIG. 6 shows a portion near the end portion in an embodiment of the optical fiber bundle in accordance with the present invention. In FIG. 6, a plurality of optical fibers 32 are fixed with one another at an end portion 38 by an acid-soluble glass 38a. A flexible plastic 33 exhibiting little change in volume during curing is charged into the interstices among the individual fibers 32 at the portion proximate the interface between the end portion 38 and a flexible portion 39. Further, the periphery of the portion proximate the aforesaid interface is covered by a plastic 34 having flexibility lower than the flexibility of the filling plastic 33 so that the length of the layer of the plastic 34 is shorter than the length of the layer of the filling plastic 33. In this manner, the periphery of the portion proximate the aforesaid interface, where the stress applied during bending is the largest, is reinforced and, at the same time, sufficient flexibility is imparted to the end section. The flexible plastic 33 should preferably be a plastic having flexibility and exhibiting little change in volume, such as Cemedine 1565/D or Araldite AY103-/HY956 (both brand names) made of epoxy resins. The flexibility of these plastics can be changed to some extent by adjusting the mixing ratio of the base material to the curing agent. When the flexibility should further be changed, it is preferable to add a flexibilizer such as DER (brand name) made by Dow Corning Corp. As the covering plastic 34, a plastic containing a reduced amount of the flexibilizer is used.

Figure 7:
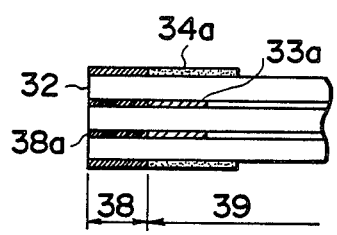
FIGS. 7 to 15 are partial sectional views showing various other embodiments of the optical fiber bundle having flexibility in accordance with the present invention.

FIG. 7 shows another embodiment of the optical fiber bundle in accordance with the present invention. The embodiment shown in FIG. 7 is similar to the embodiment shown in FIG. 6, except that a covering plastic 34a having flexibility higher than the flexibility of a filling plastic 33a is applied around the periphery of the portion proximate the interface between the end portion 38 and the flexible portion 39 over a length longer than the length of the filling plastic 33a. In this manner, the periphery of the portion proximate the aforesaid interface, where the stress applied during bending is the largest, is reinforced.

Figure 8:
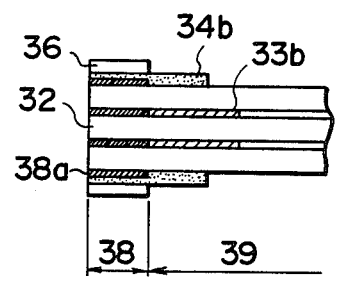

In FIG. 8, the periphery of the portion proximate the aforesaid interface is covered by a plastic 34b having flexibility lower than the flexibility of a filling plastic 33b so that the length of the plastic 34b is shorter than the length of the filling plastic 33b. The periphery thus covered by the plastic 34b is further fitted into a reinforcing pipe 36 with the flexible plastic 34b intervening therebetween in order to reinforce the end portion 38. The reinforcing pipe 36 may be made, for example, of a metal (stainless stel or aluminium), or the like.

Figure 9:
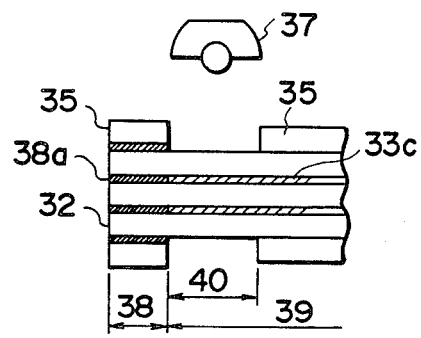

FIG. 9 is a sectional view showing the end portion in another embodiment of the optical fiber bundle in accordance with the present invention, in which a photo-setting plastic is employed as the filling plastic. In FIG. 9, a photo-setting plastic 33c is charged into the interstices among the individual fibers 32 at a portion 40 proximate the interface between the end portion 38 and the flexible portion 39, and the portions other than the portion 40 are covered by a light shielding member 35. The portion 40 is then exposed to ultraviolet rays emitted from a light source 37 (or to sunlight) in order to cure the filling plastic 33c at the portion 40. Thereafter, the uncured portion of the photo-setting plastic is removed. If necessary, in order to reinforce the vicinity of the end portion 38 of the flexible optical fiber bundle filled with the photo-setting plastic 33c at the portion 40 as described above, the end portion 38 may be fitted into a mouth piece via a plastic such as Cemedine 1565/D or Araldite AY103/HY956 and, at the same time, at least a part of the portion 40 may be covered by the aforesaid flexible plastic. As the photo-setting plastic 33c, modified acrylic resin No. 3000 or the like made by Three Bond Co. is preferable. When a photosetting plastic is employed, the position of the cured portion can be determined very accurately and the cured portion can be made very short compared with a method such as one described in Japanese Patent Publication No. 57(1982)-20603 wherein the flexible portion is cooled, the fixed end portion is heated, and the filling plastic at the portion close to the borderline between the flexible portion and the fixed end portion is cured. Accordingly, the end section thus formed can be bent at a very acute angle. Further, since the photo-setting plastic cures very quickly (for example, in several seconds), it becomes possible to conduct the production process quickly and automatically.

Figure 10:
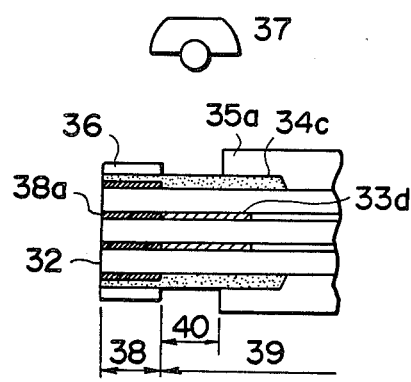

FIG. 10 is a sectional view showing the end portion in a further embodiment of the optical fiber bundle in accordance with the present invention, in which an anaerobic property-imparted type photo-setting plastic is employed instead of the covering plastic 34b in the embodiment shown in FIG. 8. In this embodiment, the end portion 38 and the portion 40 proximate the aforesaid interface are first covered with an anaerobic property-imparted type photo-setting plastic 34c, and then the end portion 38 is fitted into the reinforcing pipe 36. As a result, the end portion 38 is shielded from air, and the plastic 34c at the end portion 38 is cured. Thereafter, the portions other than the portion 40 are covered by a light shielding member 35a and the reinforcing pipe 36, and the portion 40 is exposed to ultraviolet rays emitted from the light source 37 (or to sunlight) in order to cure the covering plastic 34c at the portion 40. Then, the uncured portion of the photo-setting plastic is removed. In this case, reinforcing of the periphery of the portion 40 and fitting of the end portion 38 into the reinforcing pipe can be conducted quickly.

Figure 11:
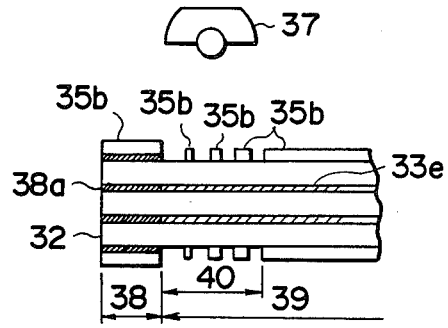

FIG. 11 shows an embodiment similar to the embodiment shown in FIG. 9, except that a discontinuous light shielding member 35b is employed so that the filling plastic 35b is intermittently cured and the areas of the cured sections thereof are gradually decreased from the end portion 38 toward the middle of the flexible portion 39. In this manner, the mechanical strength of the part of the portion 40 nearer to the end portion 38 is higher than the strength of the part of the portion 40 nearer to the middle of the flexible portion 39, thereby to minimize the breakage of fibers at the portion 40 and allow acute bending of the end section. If necessary, in order to reinforce the vicinity of the end portion 38 of the flexible fiber bundle, the end portion 38 may be fitted into a mouth piece via a plastic such as Cemedine 1565/D or Araldite AY103/HY956 and, at the same time, at least a part of the portion 40 may be covered by the aforesaid flexible plastic. Instead of intermittently curing the filling plastic 35b, it is also possible to employ a photo-setting plastic as a covering plastic and partially cure the photo-setting plastic. Further, it is also possible to employ photo-setting plastics as the filling plastic and the covering plastic and intermittently cure them.

In the embodiments described above, in addition to Cemedine 1565/D and Araldite AY103/HY956 which are epoxy resins, any other plastics may be employed as the flexible plastic insofar as they are flexible and exhibit little changes in volume during curing. As the light source for emitting ultraviolet rays, a high-pressure mercury vapor lamp is preferable. Further, an optical exposure range limiting means may be positioned on the light source side, instead of the light shielding member.

Figure 12:
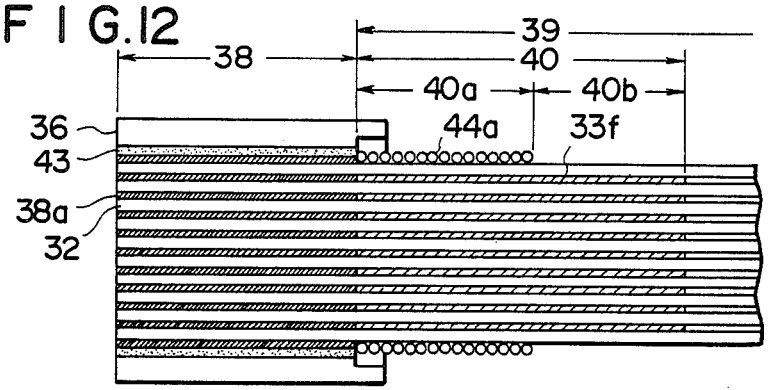

FIG. 12 shows a further embodiment of the optical fiber bundle in accordance with the present invention. In this embodiment, a filling plastic 33f having flexibility is charged into the interstices among the individual fibers at the portion 40 proximate the interface between the end portion 38 and the flexible portion 39 in the same manner as described above. As the filling plastic 33f having flexibility, it is preferable to use for example, a silicone-based adhesive (Silicone RTV), Araldite AY103, an epoxy resin made by Ciba Geigy A. G., or the like, added with a flexibilizer. Then, a linear member 44a made of a natural fiber (such as cotton or silk), a synthetic fiber (such as nylon), or the like is wound around the periphery of a part 40a of the portion 40 on the side nearer to the end portion 38. A part 40b of the portion nearer to the middle of the flexible portion 39 is not provided with the winding of the linear member 44a and is maintained in the condition filled with the filling plastic 33f having flexibility in the interstices among the individual fibers. Accordingly, there is a flexibility gradient from lower at the interface between the end portion 38 and the flexible portion 39 to higher at the middle of the flexible portion 39. In addition, the part 40a of the portion 40 on the side nearer to the end portion 38 is intermittently imparted with sufficient mechanical strength. Thereafter, in order to reinforce the end portion 38, the end portion 38 is fitted into the reinforcing pipe 36 via an adhesive 43. In this case, the mechanical strength and the bendability of the portion 40 become high, and the fibers at the portion 40 are not subjected to centralized stress. Accordingly, it is possible to obtain an optical fiber bundle exhibiting very high strength against bending, tension or the like, and high bendability of the end sections at a high efficiency.

Figure 13:
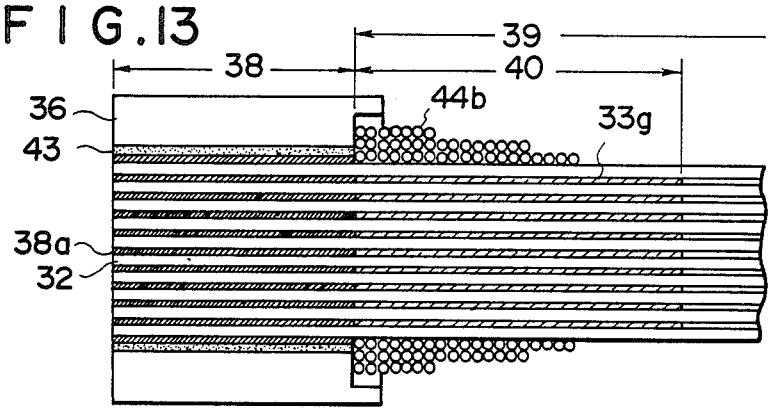

In FIG. 13, a filling plastic 33g having flexibility is charged in the interstices among the respective fibers at the portion 40 in the same manner as described above. A linear member 44b is wound in three layers around the periphery of a part of the portion 40 on the side nearer to the end portion 38 in such a manner that the number of winding layers sequentially decreases toward the center of the flexible portion 39. In this way, the mechanical strength of the part of the portion 40 on the side nearer to the end portion 38 is made higher than the mechanical strength of the part of the portion 40 on the side nearer to the middle of the flexible portion 39, and high bendability is obtained at the end section.

Figure 14:
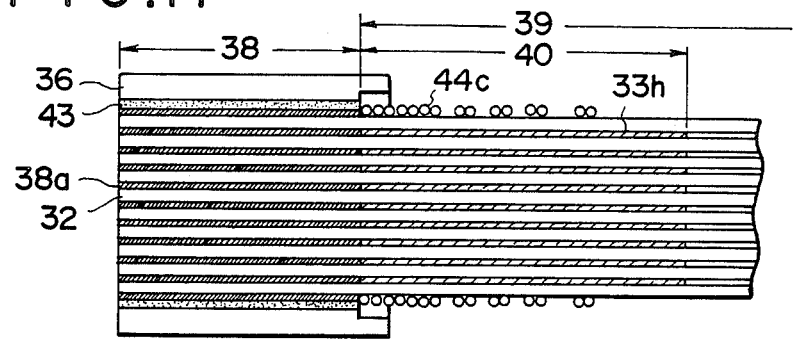
Figure 15:
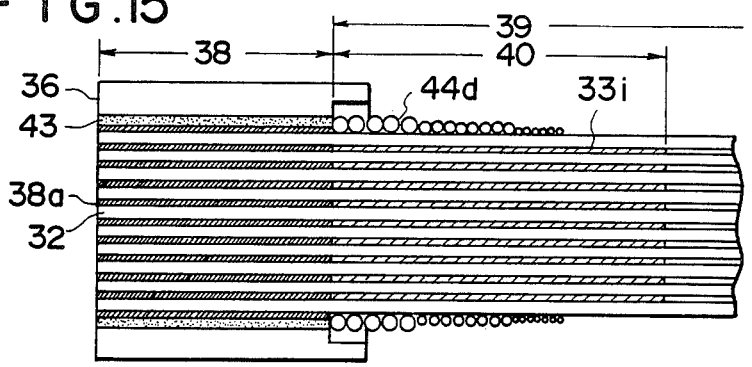

In FIG. 14, instead of decreasing the number of winding layers as shown in FIG. 13, the winding intervals of a linear member 44c are changed to obtain the same effect as in the embodiment shown in FIG. 13. In FIG. 15, instead of decreasing the number of winding layers as shown in FIG. 13, the cross-sectional area of a linear member 44d is changed to obtain the same effect as in the embodiment shown in FIG. 13. The same effect can also be obtained by using a linear member having lower stretchability on the part of the portion 40 nearer to the end portion 38, and a linear member having higher stretchability on the part of the portion 40 nearer to the middle of the flexible portion 39. It is also possible to combine the methods of winding with the linear member as shown in FIGS. 12 to 15. In FIGS. 12 to 15, winding of the linear members 44a, 44b, 44c and 44d is started from the interface between the fixed end portion 38 and the flexible portion 39. However, the winding may also be started from a point within the fixed end portion 38.

Substantially the same effects as those obtained by the above-described embodiments can be achieved also for the reinforcement of an end portion of an optical fiber bundle comprising a plurality of dual optical fibers the ends of which are fixed together by use of an inorganic adhesive (such as silica or alumina based water-soluble paste).

What is claimed is:

1. A method of making a flexible optical fiber bundle, which comprises the steps of:

(i) forming an optical fiber bundle by bundling, heating and stretching a plurality of optical fibers each comprising a core glass, cladding glass having a refractive index lower than the refractive index of the core glass and coated on the core glass, and an acid-soluble borosilicate glass coated on the cladding glass;

(ii) covering at least a portion of said optical fiber bundle with an acid-resistant material;

(iii) treating the optical fiber bundle with an acid solution, then treating the optical fiber bundle with an alkali solution, and then treating the optical fiber bundle with an acid solution, thereby to remove acid-soluble borosilicate glass from the uncovered portion of the optical fiber bundle and form said uncovered portion into a flexible portion of the optical fiber bundle;

(iv) charging a photosetting plastic resin exhibiting little change in volume during curing into interstices among the individual fibers at a part of the flexible portion of the optical fiber bundle proximate an interface between at least one covered portion of said optical fiber bundle and the flexible portion thereof from which said acid-soluble borosilicate glass has been removed, exposing a predetermined length of the part of said optical fiber bundle charged with photosetting plastic resin to light, one end of said predetermined length abutting said interface, and removing photosetting plastic resin from such length of the resin-charged part of the optical fiber bundle not exposed to light, thereby to form a boundary at the end of said resin-charged part of the optical fiber bundle opposite that end abutting said interface; and (v) forming a reinforcement around the periphery of at least a part of said bundle proximate said interface, by covering the periphery of at least a part of the bundle proximate said interface with a plastic resin of flexibility different from that of said plastic resin charged into said interstices among individual fibers of the optical fiber bundle.

2. A method as defined in claim 1, wherein said covering plastic resin is a photosetting plastic resin, and which comprises exposing a portion of said photosetting covering plastic resin to light thereby to cure it.

3. A method as defined in claim 1, wherein said covering plastic resin is an anaerobic property-imparted type photosetting plastic resin, and which comprises exposing a portion of said anaerobic property-imparted type photosetting covering plastic resin to light.

4. A method as defined in claim 3, which further comprises shielding said anaerobic property-imparted type photosetting plastic resin from air.

5. A method as defined in claim 1, wherein the optical fiber bundle has a substantially circular cross-section, and the predetermined length of photosetting plastic resin-charged optical fibers exposed to light is substantially the same as the diameter of the circular cross-section of the optical fiber bundle.

* * * * *